May 29, 1945.　　　C. C. STRATTON　　　2,377,280
AIRCRAFT LANDING WHEEL
Filed March 24, 1943　　　2 Sheets-Sheet 1

Inventor
Cleo C. Stratton

By Clarence A. O'Brien
and Harvey B. Jacobson
Attorney

May 29, 1945. C. C. STRATTON 2,377,280
AIRCRAFT LANDING WHEEL
Filed March 24, 1943 2 Sheets-Sheet 2
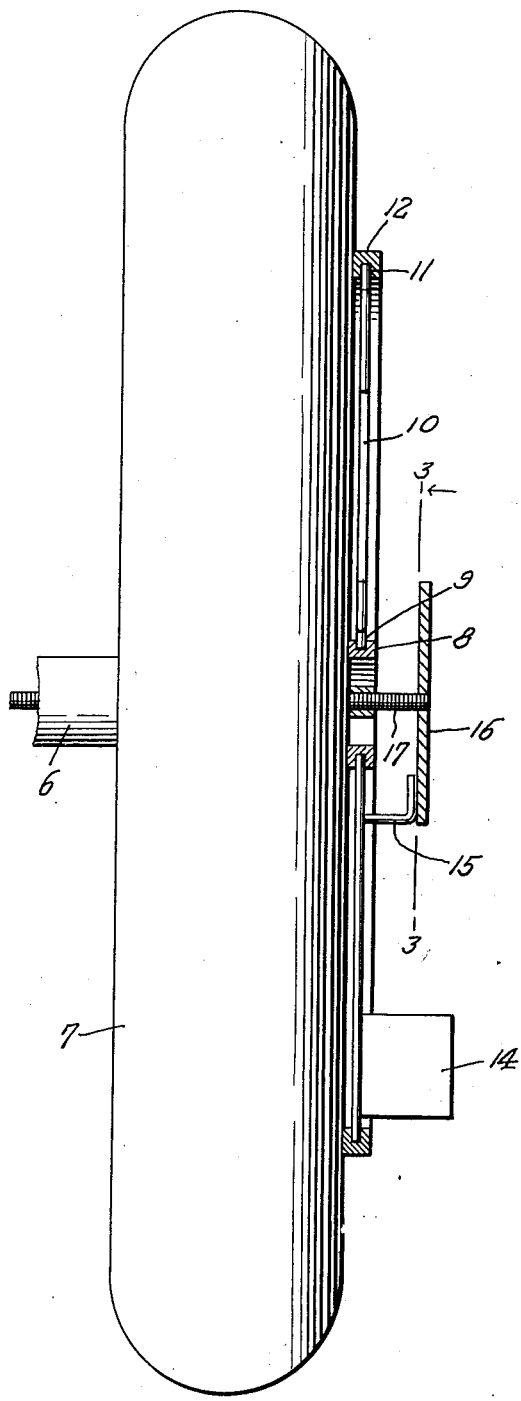
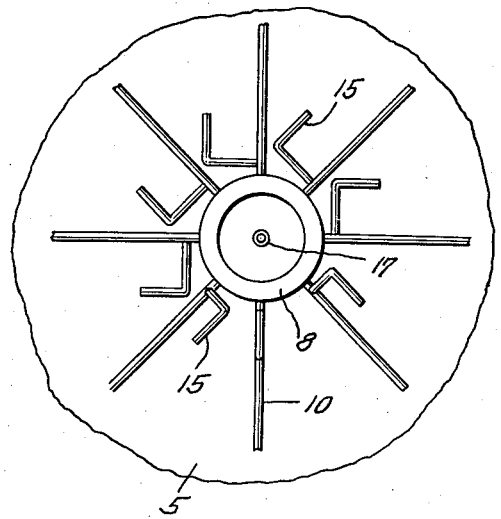
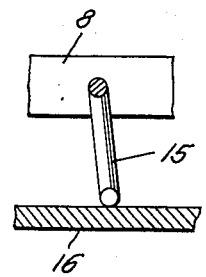
Inventor
Cleo C. Stratton
By Clarence A. O'Brien
and Harvey B. Jacobson
Attorneys Patented May 29, 1945

2,377,280

UNITED STATES PATENT OFFICE 2,377,280

AIRCRAFT LANDING WHEEL

Cleo Cecil Stratton, Ballinger, Tex.

Application March 24, 1943, Serial No. 480,404

2 Claims. (Cl. 244—103)

The present invention relates to new and useful improvements in airplane wheels and more particularly to means for rotating the wheels when the airplane is landing to reduce wear on the tire usually caused by the engagement of the stationary wheel with the ground.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which—

Figure 2 is a vertical sectional view taken substantially on a line 2—2 of Figure 1.

Figure 3 is a fragmentary detail of the hub portion of the wheel showing the cranks for actuating the vanes.

Figure 4 is a fragmentary sectional view taken on a line 4—4 of Figure 1, and

Figure 1:
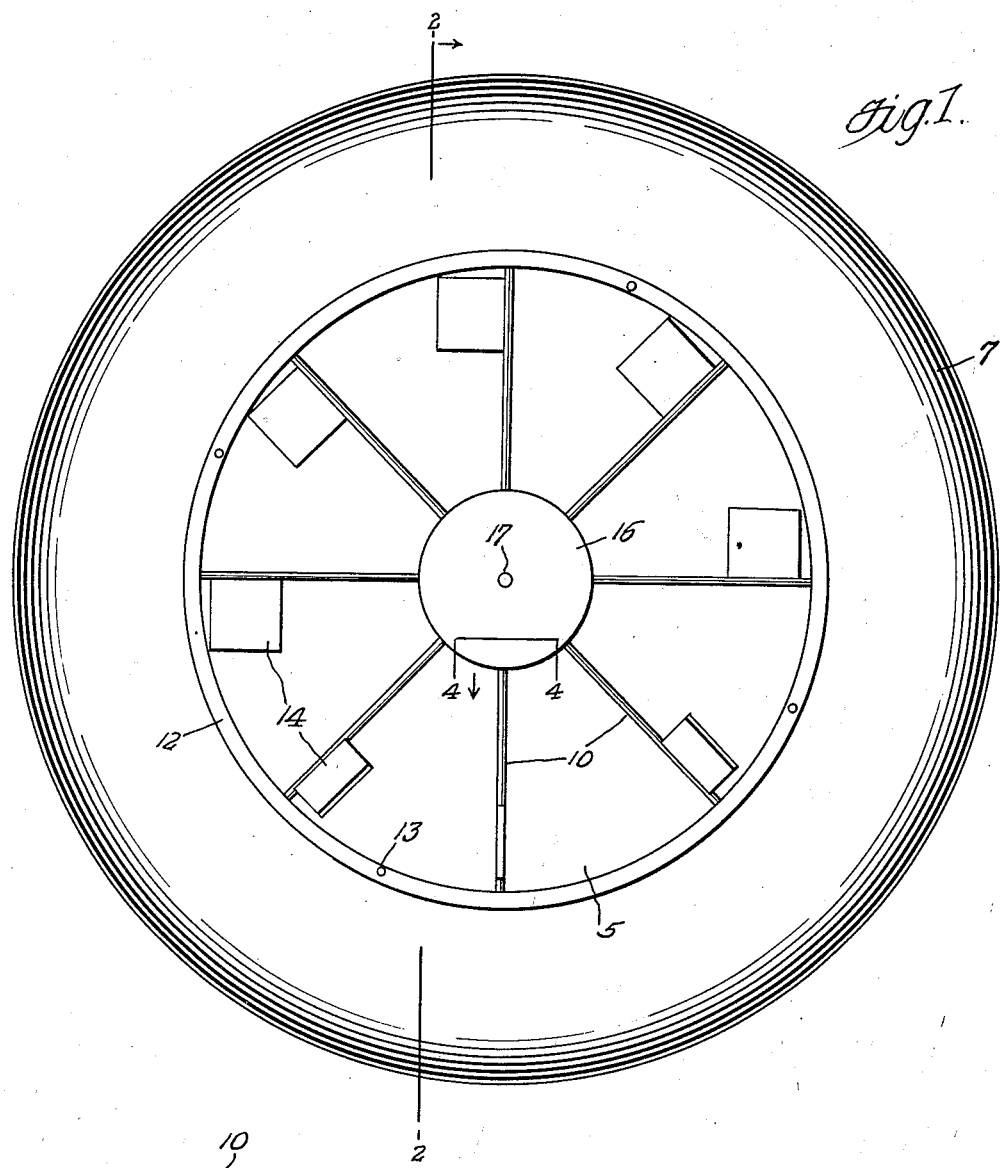
Figure 1 is a side elevational view of a wheel equipped with my invention.
Figure 5:
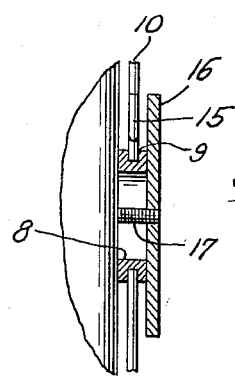
Figure 5 is a fragmentary sectional view through the hub.

Referring now to the drawings in detail wherein for the purpose of illustration I have disclosed a preferred form of my invention, the numeral 5 designates an airplane landing wheel freely rotatable on the axle 6, the wheel having the tire 7 mounted thereon in the usual manner.

On one side of the wheel is a hub 8 having radial sockets 9 therein and within which are rotatably seated the inner ends of rods 10 which have their outer ends similarly inserted in sockets 11 formed in a ring 12 secured to the rim of the wheel by screws or the like 13.

The rods are provided with vanes or blades 14 adjacent their outer ends which project radially from the rods and outwardly with respect to the adjacent side of the wheel in a position to respond to the air stream of the moving airplane for rotating the wheel.

The rods 10 are provided adjacent their inner ends with L-shaped cranks 15 projecting radially from the rods and adapted to abut a disk 16 carried at the outer end of a rod 17 disposed axially of the axle 6 and having a flexible cable 18 attached thereto leading to the pilot's cabin of the airplane. The disk acts as a stop for engagement by the cranks 15 to limit rotation of the rods 10 in their sockets and thus control the swinging of the vanes 14 outwardly to a desired angle for regulating the speed of rotation of the wheel.

The pressure of the air striking the vanes at the lower portion of the wheel will cause such vanes to swing outwardly into operating position, while pressure of air striking the vanes at the upper portion of the wheel will cause a feathering of those vanes.

The vanes may be secured in an inactive position, when desired, by moving the disk 16 inwardly to hold the cranks closely against the hub of the wheel.

It is believed the details of construction, operation and manner of use of the device will be readily understood from the foregoing without further detailed explanation.

Having described the invention, what I claim as new is:

1. An airplane wheel rotating device comprising a plurality of rods, means for pivotally mounting the rods on the wheel in a radial position, a vane projecting laterally from each rod adjacent its outer end and adapted to respond to the air stream of the moving airplane to swing the vane outwardly on its pivot into a position for rotating the wheel, and remote control means extending axially through the wheel for limiting swinging movement of the vanes.

2. An airplane wheel rotating device comprising a plurality of rods, means for pivotally mounting the rods on the wheel in a radial position, a vane projecting laterally from each rod adjacent its outer end and adapted to respond to the air stream of the moving airplane to swing the vane outwardly on its pivot into a position for rotating the wheel, a crank adjacent the inner end of each rod, a disk engageable with the cranks to limit swinging movement of the vanes, and manipulating means extending axially through the wheel and connected to the disk for adjusting the latter relative to the cranks.

CLEO C. STRATTON.